United States Patent [19]
Atkins et al.

[11] Patent Number: 5,582,118
[45] Date of Patent: Dec. 10, 1996

[54] REMOVAL OF ORGANIC CONTAMINANTS FROM SOLID PARTICLES

[75] Inventors: Martin P. Atkins, Middlesex; David A. Kidd, Hampshire, both of England

[73] Assignee: Torftech Limited, Reading Berkshire, England

[21] Appl. No.: 280,227

[22] Filed: Jul. 25, 1994

Related U.S. Application Data

[63] Continuation of PCT/GB93/00154, Jan. 25, 1993.

[30] Foreign Application Priority Data

Jan. 25, 1992 [GB] United Kingdom .................... 9201620
Jul. 21, 1992 [GB] United Kingdom .................... 9215491

[51] Int. Cl.⁶ ............................. B09B 3/00; F23G 15/00
[52] U.S. Cl. ............................................ 110/346; 110/236
[58] Field of Search ...................... 110/236, 243, 110/309, 310, 348, 213, 264, 346

[56] References Cited

U.S. PATENT DOCUMENTS

| | | | |
|---|---|---|---|
| 3,807,942 | 4/1974 | Culpepper, Jr. | 432/72 |
| 4,139,462 | 2/1979 | Sample, Jr. . | |
| 4,181,494 | 1/1980 | Kimberley | 432/2 |
| 4,304,609 | 12/1981 | Morris . | |
| 4,313,785 | 2/1982 | Schellstede . | |
| 4,654,150 | 3/1987 | Young . | |
| 4,685,220 | 8/1987 | Meenan et al. . | |
| 4,869,810 | 9/1989 | Ellingsen et al. . | |
| 4,880,528 | 11/1989 | Westhoff . | |
| 4,960,440 | 10/1990 | Betz . | |
| 4,969,406 | 11/1990 | Buzetzki | 110/341 |
| 5,052,312 | 10/1991 | Rackley et al. | 110/346 |
| 5,075,981 | 12/1991 | Dodson . | |
| 5,078,593 | 1/1992 | Schreiber, Jr. et al. | 432/103 |

FOREIGN PATENT DOCUMENTS

| | | | |
|---|---|---|---|
| 0021875 | 1/1981 | European Pat. Off. | F23G 7/00 |
| 0068853 | 1/1983 | European Pat. Off. | B01J 8/14 |
| 0324566 | 7/1989 | European Pat. Off. . | |
| 2361606 | 8/1977 | France | F23G 7/00 |
| 3814723 | 11/1988 | Germany . | |
| 0025477 | 2/1977 | Japan | 110/243 |
| WO91/13948 | 9/1991 | WIPO . | |
| WO92/09377 | 6/1992 | WIPO . | |
| WO93/15361 | 8/1993 | WIPO . | |
| WO94/19122 | 9/1994 | WIPO . | |

OTHER PUBLICATIONS

Groszek, M. A. The Torbed Process: A Novel Concept in Heat and Mass Transfer, International Deep Mining Conference: *Innovations in Metallurgical Plant* 1990 pp. 191–195.
Davy Product Brochure The Torbed Process A small Revolution in Heat and Mass Transfer.
Reprint from Process Equipment News Jul. 1987 Product & Applications Recent Developmens in thermal processing technology by Lambert.

*Primary Examiner*—Henry A. Bennett
*Assistant Examiner*—Susanne C. Tinker
*Attorney, Agent, or Firm*—Nixon & Vanderhye

[57] ABSTRACT

Organic contaminants of solid particles, especially oil in drill cuttings, are removed by passing the contaminated particles into a processing chamber, generating a circumferentially directed flow of fluid within the chamber to cause the particles to circulate in the chamber in a turbulent compact band, incinerating the particles and removing them substantially free from organic contaminants from the chamber.

22 Claims, 1 Drawing Sheet

REMOVAL OF ORGANIC CONTAMINANTS FROM SOLID PARTICLES

This is a continuation of PCT Application No. PCT/GB93/00154, filed 25 Jan. 1993.

This present invention relates to a method for the removal of organic contaminants, especially oily contaminants, from solid particulate material and more particularly to a method for the removal of oil from cuttings obtained from drilling operations using oil-based drilling muds.

BACKGROUND OF THE INVENTION

Drilling muds are used to carry rock cuttings out of the wellbore and to the surface. Both water-based and oil-based muds are used as drilling muds. Water-based muds are generally less toxic than those based on oil but the latter possess many operational advantages, particularly for the drilling of high angle, long reach and high pressure/high temperature wells.

However conventional oil based muds also suffer from a number of undesirable characteristics. In particular oil may be retained on the drill cuttings resulting in adverse environmental considerations.

It is very important therefore that any oil retained on cuttings should be removed before disposal, particularly in drilling operations offshore where cuttings may be discharged to the sea, rivers or lakes and cause oil pollution e.g. of the marine environment. Alternatively they have to be transported onshore for disposal which can be costly and time consuming. Future legislation will also require current discharge levels to be reduced.

If the use of oil based drilling muds is to continue, despite more restrictive discharge legislation, efficient methods of reducing or preventing oil pollution on cutting discharge will be required.

A solution to the problem of reducing oil discharge into the sea would be the use of treatment facilities on an offshore platform to remove the oil and allow the discharge of clean cuttings into the sea.

Several methods have been used to remove oil from drill cuttings. In one method the oil based mud is washed from the surface of the cuttings by use of a fluid medium, for example a detergent. The cuttings are then discharged and the oil recovered from the wash fluid. A major limitation in this method is that oil internally absorbed into the pores of the rock cannot be removed and between 30 and 50% of the original oil may be retained.

Another method involves cleaning rather than washing the cuttings. This may be carried out by means of a solvent extraction system using, for example, toluene or methylene chloride as the solvent. Oil may be extracted from the cuttings and then removed from the solvent and reused. However the potential hazards caused by the toxic nature of the solvent chemicals have raised doubts about the method.

DESCRIPTION OF THE INVENTION

We have now found a method capable of removing substantially all the organic contaminants in which a toroidal reactor may be used for the incineration of the organic contaminants on solid particulate material to produce particles substantially free from contaminants for safe disposal into the sea or land fill operations.

Thus according to the present invention there is provided a method for removing organic contaminants from solid particles containing at least one organic contaminant, which method comprises:

(a) providing solid particles contaminated with an organic contaminant to a processing chamber, (b) generating a circumferentially directed flow of fluid within the chamber to cause the particles to circulate about an axis of the chamber in a turbulent compact band, (c) incinerating the particles within the chamber and (d) removing the particles substantially free from organic contaminants from the chamber.

The solid particles comprise at least one contaminant which is liquid at 25° C. in amount of at least 0.01% eg. at least 0.1% or at least 1% by weight (based on the total weight of solid particles and organic contaminants). The total amount of organic contaminants is usually 1–20% such as 5–15% or 10–20% by weight on the same basis. The solid components of the particles usually comprises a majority and especially at least 60 or 70% or 80% of the total of solid and contaminants. The solid particles are usually sticky solids.

The organic contaminant is usually a liquid and especially a liquid hydrocarbon. The contaminant may be volatilizable as such (e.g. at 400° C.) such as a hydrocarbon oil e.g. gas oil, diesel oil or kerosene, or the products obtained by cracking it in the processing chamber may be volatilizable or entrainable as a mist of droplets, such as heavier oils eg. refining oil or crude oil.

In particular the oil is one used to make oil based drilling muds such as diesel oil or kerosene. The solid may also be contaminated with water as well as the organic contaminant, as happens with many drill cuttings; the amount of water may be 1–20% eg. 2–10% or 5–20% by weight of the total of water, oil and solid particles. The contaminated solid usually contains an inorganic chloride containing compound and usually has at least 0.01% or 0.1% such as at least 1% wt e.g. 1–40% chloride ion in the contaminated solid. Thus preferably the contaminated solid particles comprise 60–92% inorganic solid, 5–20% organic contaminant and 3–20% of water, based on the total weight of the particles, in the case of the drill cuttings amounts of any inorganic drilling fluid components such as inorganic weighting agents, such as barytes and/or densifying agents such as alkali metal or alkaline earth metal (e.g. Mg, Ca) halides (especially chlorides) or viscosifiers e.g. clays such as bentonite are included in the inorganic solid percentage.

The solid particles are ones capable of being contaminated and usually stable to the conditions for incineration eg. stable to at least 600° C. especially at least 800° C. They are usually inorganic and are preferably of rock, especially sandstone (including rotliegendes sandstone), siltstone, shale and halite. The invention is particularly useful for removing oil from drill cuttings or from shale, but is also useful for removing pollutant oil from sand, pebbles or soil and for treating refinery sludges and similar wastes and foundry sand. The average diameter of the particles is preferably less than 3 cm, most preferably less than 2 cm, such as 0.1–30 mm or 0.5–20 mm. The solid particles in particular drill cuttings are often in the form of a sticky mass comprising inorganic particles, often of 2 particle size ranges, as well as organic contaminant e.g. oil and often water. The inorganic particles are usually insulating with poor thermal conductivity, and are often at least partly siliceous. The particles may have a fine component comprising clay eg. bentonite and rock flours and inorganic water insoluble salts e.g. barytes, the fine component having an average particle size of 2–800 microns such as 5–400 microns. The particles may also have a coarse component comprising the rock, with an average particle size of 0.2–30 mm such as 3–20 mm. The coarse and fine components may be present in relative weight amounts of 10–90:90–10 in particular 50–80:50–20. Inorganic water soluble salts eg. alkali metal or alkaline earth metal halides may be present eg. with the rock and/or fines and/or in the water (if present).

In the processing chamber the particles are formed into a turbulent compact band circulating around an axis of the chamber which is usually substantially vertical e.g. with a possible deviation of up to 15° or 5° either side of vertical.

Usually the processing chamber is of circular-cross section in its vertical orientation and is suitably of a cylindrical shape into which the fluid ie. hot gas, is introduced from the base thereof ie. through a lower zone and the solid particles whose organic content is to be reduced can be introduced either from the top thereof or via a side feed directly into the band. The hot gas can be introduced into the chamber in the form of a jet stream which passes through a series of angular fixed blades arranged in a circular shape corresponding to the internal circumference of the processing chamber at its widest internal diameter. This configuration causes the hot gas directed at the underside of the blades at an angle parallel to the axis of the chamber to be deflected by the blades and emerge into the chamber at an angle away from the axis and towards the circumference of the chamber. The continuous upward flow of the hot gas causes particles entrained in the flow to move in a toroidal band. This effect is accentuated by the gravitational effect which urges the entrained particles to fall back. However, the ratio of the mass of the entrained particles and the velocity of flow of the hot gas is so selected that they enable the particles of the bed to remain in suspension and thereby assume and remain in a substantially toroidal shape. By "toroidal" shape is meant here and throughout the specification that the gases are caused to flow so that the particles move in a circular fashion forming a cylindrical doughnut shape around the widest internal circumference of the chamber with respect to the central axis of the processing chamber but also in a spiral flow around the internal circular axis of the doughnut shape so formed. The mode of entry of the hot gas is so controlled by a series of spaced baffles or blades, which suitably form an annulus at the base of the chamber, that the creation of a toroidal shape is facilitated and accentuated. The rate of flow of the hot gas into the processing chamber is so controlled that the gas acts as a support medium for a bed of particulate material which is kept afloat and in suspension above the support medium rather on the principle of a "hovercraft". The toroidal shape of the particulate band particles and the direction of flow of the hot gas also causes the incoming contaminated particles to move in a toroidal manner and intermingle substantially thoroughly and uniformly with the particles already in the band. A particularly suitable apparatus of this type which can be used in the process of the present invention is claimed and described in the published EP-A-0 068 853, the disclosure of which is incorporated herein by reference. In this publication, the apparatus described also acts on the "hovercraft" principle and uses a momentum of exchange between a gas stream (the hot gas) and a mass (the solid particles). By inverting the flow of the gas stream (compared to that in a hovercraft) and by channelling the gas stream through a series of blades, the resultant linear jets of gas act as a support medium for a shallow bed (50–75 mm in depth) of particles which can be floated over the gas stream. The hot gas usually has a velocity through the blades of at least 20 m/sec e.g. 40–100 m/sec. The blades convert the pressure head in the gas stream into a velocity head and, by suitable blade design, forces can be exerted on the band causing it to lift and be transported horizontally. This exchange of energy is one of the fundamental differences between a fluidized bed reactor and the reactor apparatus of EP-A-0 068 853, which is sold under the trade mark "TORBED®" in which a toroidal bed of particulate material is achieved.

In the case of the TORBED® reactor, the momentum of the gas stream, which is normally the product of mass flow and its velocity, for a given bed may be supported either by a low velocity gas stream with a high mass flowrate, or, by a high velocity gas stream with a correspondingly low mass flowrate.

The ability to control the momentum of the hot gas as described above enables the use of particles having large-size range distributions. Thus the shape of the particles being processed may be spheroidal but need not be; they may be flakes, rings, extrudates or of other irregular shapes, but are preferably not sheet like structures such as metal shavings.

In the TORBED® reactor, blades are formed into an annulus at the base of the process chamber thereby enabling maximum exposure of all the material in the particulate band to the area in which the velocity of the gases are at a maximum.

EP 68853 describes apparatus for processing matter in a fluidised bed of particulate material whereby the matter to be processed is suspended as a shallow bed above jets of support medium. The bed is annular and a gently rotating bed of material can be contained in a compact shape with the support medium being passed through the bed. By causing the bed material to circulate in this way a toroidal bed of particulate material is achieved with advantages over conventional fluidised bed processes. Generally hot fluid gas is passed upwardly and circumferentially through a multitude of inlets e.g. in the form of a ring of fixed blades, located in an annulus, onto which the particles are slowly discharged, preferably substantially uniformly round the annulus. The gas supports the particles and causes them to circulate turbulently in a toroidal band round the chamber above the annulus. The openings are usually at an acute angle to the said circulation axis e.g. 45°–80° to said axis. The contamination with the particles is incinerated to leave substantially uncontaminated particles and produce combustion gas.

The hot gas comprises gas for combustion of the organic contaminants and usually comprises a gas comprising molecular oxygen such as air; said fluid is an oxidizing gas and is preferably a mixture of combustion gases (which may comprise carbon monoxide and/or carbon dioxide and optionally lower alkanes such as methane, ethane, propane or mixtures thereof) and a gas comprising molecular oxygen e.g. air or oxygen or oxygen enriched air. The amount of oxygen is at least sufficient for the combustion of the organic contaminant in the processing chamber.

Suitable temperatures for incineration are at least 500° C. e.g. 500°–1200° C. such as 1000°–1200° C. but preferably at least 600° C. e.g. in the range 600° to 1200° C., and especially 650° to 950° C. The temperature in the upper part of the processing chamber is usually higher than that in the band; the former temperature may be 1000°–1300° C. or 1000°–1200° C. while the latter may be 600°–1000° C. especially 650°–900° C. Incineration temperatures are usually below the melting point of the inorganic particles, especially at least 20° C. e.g. at least 50° C. below said point. Thus in particular incineration temperatures for particles comprising halite are usually 600°–700° C. Suitable residence times for use in the method of the present invention may be 1–100 sec e.g. 5–30 sec especially 10–20 sec in the band and 0.5–5 sec during the passage of the contaminated solid through the chamber from the entry port to the band.

The heat for the incineration may be provided by burners located suitably beneath the processing chamber e.g. beneath the annular baffles/blades at its base or externally of the apparatus comprising the chamber. The burners are used for start up and may be used during operation. However, they may be used only to provide make up heat during operation because unless the incineration temperature is very high the process may be performed substantially autothermally, with the majority of the heat for the incineration being produced by the incineration. Extra air/oxygen is usually added to the combustion gases before passing through the blades. Advantageously there is no separate burner in the processing chamber.

The reactor and especially the processing chamber may be made of metal e.g. steel with a refractory liner, or the chamber itself may be made of ceramic.

The process of the present invention can be carried out by a batch, semi continuous or a continuous process. It is preferable to use a reactor in which particles of at least partly reduced organic content are withdrawn through a central discharge facility at the base of the reactor or a side exit port whereas the exit gases containing the gaseous material are at least partly recovered from the top of the reactor. If desired, means for removing solid fines eg. a cyclone may be entered by the exit gas shortly after leaving the reactor in order to reduce its solid content. Sealing means are usually provided to restrict or stop exit of hot gases from the chamber while the solid particulate feed is being moved into the chamber. Conveniently the means involves a closed hopper and/or rotary valve for the feed, or a continuous suction port chamber which operates at a slightly negative pressure relative to external environment.

The method of invention produces from the organic contaminant a gaseous material which leaves the processing chamber in the exit gas which may also contain the fluid for the toroidal band, in particular flue gas. Usually the gaseous material is non reducing, in particular it is preferably slightly oxidising to ensure there has been substantially complete combustion of the organic contaminant.

At start up of the reactor, there may be employed the preliminary steps of (i) providing solid uncontaminated particles to the processing chamber and (ii) generating a circumferentially directed flow of fluid within the chamber to cause the uncontaminated particles to circulate about an axis of the chamber in a turbulent compact band, especially about a substantially vertical axis.

The uncontaminated particles, which are usually stable to the incineration conditions and are usually inorganic, may be previously treated contaminated material, from which the contaminants have been removed which is preferred, or other material, such as silica/alumina, or incineration pellets eg. sand or ceramic beads. When the spent particulate material is very fine powder and/or comprises halite, the other material, which is usually an inert solid, is preferably also present and extra may be added as required; at least some of the very fine powder spent material may be entrained by the exiting gas from the chamber and may be separated therefrom.

The fluid particles containing the organic contaminant are fed into the processing chamber either batch-wise, semi continuously or continuously. In a batch process the contaminated solid, preferably mixed with uncontaminated particles, may be treated in the processing chamber to cause combustion until it is complete. In a semi continuous process the solid is added discontinuously to the chamber, more being added when the rate of incineration appears to be slowing down, while in a continuous process contaminated solid is added by means of a continuous feed and reduced contaminated product is withdrawn, both continuously. In all cases it is preferred to heat the processing chamber to the desired temperature eg. with hot flue gas before starting to feed the contaminated solid.

The feeding of the contaminated solid to the processing chamber is normally by way of a solids feeder eg. a gravity feeder, such as a hopper, and/or a solids displacement pump, in both cases with means of inhibiting exit of gases from the processing chamber. In a further aspect of the invention the contaminated solid is passed into the chamber in the form of a suspension in an inert liquid, especially in the form of a pumpable slurry; the weight content of the solid in the suspension may be 10–50%. The liquid is one which is incineratable in the processing chamber. The liquid is usually a solvent for at least part of the organic contaminant, eg. cyclohexane or petroleum hydrocarbons, and advantageously is the same as at least part of the organic contaminant eg. diesel oil or kerosene. The suspension may contain in solution some of the contaminants in the original solid which have been leached by the solvent. Pumpable slurries are easier to handle than the contaminated solid, especially drill cuttings which are usually sticky solids.

The process of the invention reduces the organic contaminant level to a level much lower than that of the contaminated solid preferably to less than 2% of the original level; thus the oil content of oil drill cuttings may be reduced to 100 ppm or less.

The process can use a smaller lighter reactor which is of great benefit on a drilling platform where savings of weight and space are important. The reactor may also be of greater mobility, so that for example, it may be mounted on a truck and taken to the site of the contaminated solid eg. soil or sand contaminated with petroleum products.

It is a particular advantage of the method of the present invention when used on an offshore platform that the produced gas from the platform may be used to fuel the burners.

After the incineration step the particles, e.g. drill cuttings, are substantially free from contaminated oil and may safely be disposed into the sea or for land fill. The particle size of the decontaminated solid is usually that of the feed though higher size particles may exit the reactor by gravity and fines be entrained with exit gas. Inorganic soluble salts eg. halides may be present in the fines. Some attrition of particles in the band may happen.

The heat generated from the incineration process may suitably be used for other purposes.

BRIEF DESCRIPTION OF THE DRAWING

The invention is illustrated in the accompanying drawings in which

FIG. 1 shows schematically the outline of a TORBED® reactor 13 which is based on that in EP-A-0068853, with inlet line 1 for input gases leading to an annular lower zone 2 (which is a hot gas swirl chamber) and which surrounds a frustoconical duct 3 of downwardly decreasing diameter leading to solids exit line 4. In gaseous communication with said zone 2 is an annulus of blades 5 each of which blades is at an angle to the horizontal, which allows the gas to pass therethrough but provide it with a circumferential as well as upward movement. Blades 5 and above them an incineration chamber 6 are in an upper zone 7 to said reactor which is fitted with solid inlet line 8 and gaseous exit line 9. Spaced between line 9 and chamber 6 is an annular baffle 10. Directly below solid inlet line 8 is a distributor 11, which may be an inverted conical distributor as shown or a spinning plate (not shown), said distributor outwardly extending beyond a weir 12 which is inside the annulus of blades 5. The weir 12 leads to the frustoconical duct 3. Means (not shown) can be provided for heating the gas in annular zone 2, or inlet gas in line 1 can have been externally heated before entry into the reactor. In use a toroidal band of solids is maintained above the blades 5 and circumferentially moved thereon by the upward gas flow from zone 2. Organic contaminated solids are fed through line 8 from the hopper (not shown) without exit of hot gases, onto distributor 11, which spreads them onto the band of solids over the blades 5 where they are heated by the hot gas flow causing volatilization and burning to generate a gaseous material, which leaves chamber 6 round baffle 10 and hence line 9, and a solid decontaminated residue eg. substantially oil free drill cuttings which fall over weir 12 and pass via duct 3 and line 4 preferably without entry of any external gas eg. air back up line 4 into the upper zone 7.

Figure 1:
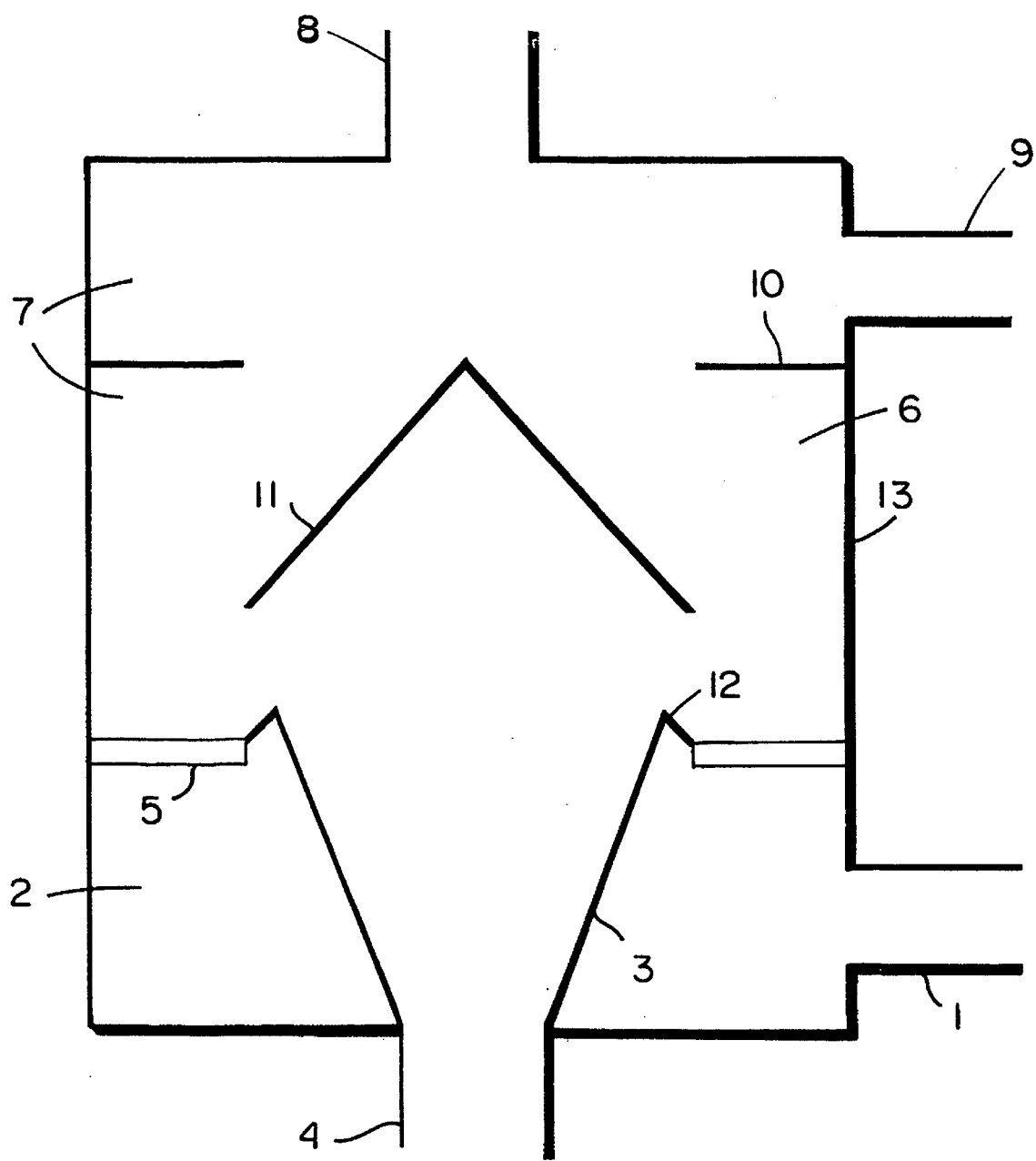
FIG. 1 represents schematically a reactor for use in the process of the invention.

In the chamber the particles comprising the organic contaminants are submitted to an oxidative thermal treatment in which the particles are heated up under oxidative conditions, eventually to result in combustion of the organics and/or cracking products therefrom and residual solids substantially free of organics.

It is believed, but Applicants do not wish to be bound by any theory, that in the process of the present invention, the organic contaminated solid is passed into the band from the entry port, while it is being heated slightly. In the band this preheated solid is heated very quickly by the band of hot solids and/or the high heat flux of hot gas causing volatilisation of organics into the processing chamber above the band, and volatilisation of any water, leaving the inorganic solids and any organic non volatiles. The quick heating may also cause thermal shock to the solids resulting in size diminution. The organics in the chamber above the band burn to carbon dioxide, as do the residual non volatiles in the band, though the latter may also crack and the products volatilise and burn. By the time the freshly formed decontaminated inorganic solids reach a temperature of at least 600° C., their organic content has been essentially removed.

The method of the present invention can provide exit gases and decontaminated solids substantially free of dioxin and dioxin like compounds and PCBs even when the contaminated solids contain organics and chloride containing compounds.

EXAMPLES

The invention is illustrated by reference to the following Examples.

Example 1

A Torbed T400 cyclone reactor supplied by Davy McKee Limited (Stockton on Tees, Cleveland, UK) of the type described in EP 68853 was fitted with a side burner and air blower, a side exit port and a batch feed hopper. The reactor was as shown diagrammatically in FIG. 1 apart from absence of baffle 10 and replacement of the central discharge port by a side exit port above the blades 5 and the burner and air blower providing gases entering line 1. The reactor temperature was controlled at 1000° C. at 25 mm above the band, which circulated about a vertical axis, and a bed of ceramic beads was used initially as the uncontaminated inorganic particles.

Oil based mud coated drill cuttings of approximate composition by weight 16.4% oil, 10.9% water and 72.7% siliceous rock (shale), were added in batches at a rate of approximately 900 g/min providing a residence time in the band of approximately 15 secs. A representative sample was collected from the side exit port and referenced as Sample 1.

The particulate bed was emptied and a screw feeder connected to the reactor. Cuttings were fed into the reactor at a rate of approximately 2 Kg/min. A further sample was collected and references as Sample 2.

The samples were analysed by means of a "loss on ignition" test at 450° C. in a crucible in a muffle furnace. For comparison the oil base mud coated cuttings before incineration were analysed.

The results are given in Table 1 with weights of the crucible with and without sample, before and after ignition of the sample.

TABLE 1

| | WEIGHTS (gms) | | | | | |
| --- | --- | --- | --- | --- | --- | --- |
| | Contaminated Drill Cuttings | | Sample 1 | | Sample 2 | |
| | Before | After | Before | After | Before | After |
| Crucible + Sample | 34.97 | 31.47 | 29.70 | 29.76 | 29.07 | 29.13 |
| Crucible | 20.96 | 20.96 | 20.64 | 20.64 | 21.14 | 21.14 |
| Sample | 14.01 | 11.51 | 9.06 | 9.12 | 7.93 | 7.99 |
| Loss on Ignition | 2.50 (17.8%) | | −0.06 | | −0.06 | |

The results show that after incineration the cuttings represented by samples 1 and 2 were substantially free of oil shown by the loss of volatiles on ignition. By comparison the untreated drill cuttings showed almost a 20% loss of volatiles (oil and water) on ignition.

Example 2

A Torbed T400 cyclone reactor of the type described in EP 68853 supplied by Davy McKee Limited and otherwise the same as used in Example 1 was fitted with a central feed tube (8), a central discharge port (4) for coarse cuttings (in general of 0.5–20 mm diameter) and an upper side vent (9) for fine cuttings (in general less than 0.5 mm diameter). The reactor was as shown diagrammatically in FIG. 1 but without the baffle 10. The upper side vent was connected to a cyclone which prevented the discharge of fine cuttings to the atmosphere. Exhaust gases were vented via a scrubber arrangement to the atmosphere. The reactor was also fitted with a natural gas side burner and an air blower, combustion gas from the burner and/or extra air (when present) entering reactor 13 via line 1 and forming the fluid passing through an annular blade ring and supporting the cuttings, the proportion of gas to extra air and the temperature of the gas (from the burner) being varied to control the bed temperature to the desired figure.

Raw material cuttings containing about 12.1–16.4% oil, 10.6–17.9% water and 68–77% rock with sodium chloride and/or potassium chloride were discharged into the chamber towards a central cone which served to distribute the cuttings radially onto the blade ring.

Cuttings motion within the reactor was achieved by passing the fluid at a rate of 50–80 m/sec through the blades. This produced a circular motion of the cuttings around a vertical axis, which was maintained until the cuttings spilled over a weir into the central discharge port. The residence time (15–30 sec) was sufficient to remove any liquid attached to the cuttings by volatilisation and combustion in the upper part of the chamber which was at 900°–1000° C. and incineration of any residual non volatilised organics.

A number of samples of different lithology were treated.

The oil retention values were determined by a standard retort technique with distillation at about 600° C. for the raw cuttings (R) and about 800° C. for the processed samples (P) and are quoted as g(oil) per kg (dry retorted solids). Water retention was also determined in the same test.

In all but Experiment 7, the values were obtained from coarse incinerated cuttings discharged from the central discharge port. For Experiment 7, the values were obtained from the fines collected from the cyclone, after passing through the higher temperatures of about 1000° C. in the upper part of the chamber.

Results set out in the following Table 2 were obtained.

TABLE 2

Oil (and Water) Retention Figures

| Experiment | Sample (Rock) | Raw (R) Proc. (P) | Bed Temp (°C.) | Oil Ret (g/kg) | Water Ret (g/kg) |
|---|---|---|---|---|---|
| 1 | 1 | R | — | 131.58 | 178.85 |
| 2 | 1 | P | 600 | 0.76 | 13.34 |
| 3 | 1 | R | — | 121.84 | 149.76 |
| 4 | 1 | P | 900 | 0.0 | 6.45 |
| 5 | 7(SST) | R | — | 126.90 | 166.73 |
| 6 | 7(SST) | R | — | 130.55 | 178.97 |
| 7 | 7(SST FINE | P | 900 | 0.0 | 0.0 |
| 8 | 7(SST CRSE) | P | 900 | 0.0 | 16.57 |
| 9 | 3(SLT/SST) | R | — | 157.41 | 130.21 |
| 10 | 3(SLT/SST) | P | 900 | 0.0 | 6.63 |
| 11 | 6(HALITE) | R | — | 128.50 | 106.32 |
| 12 | 6(HALITE) | P | 900 | 0.0 | 0.0 |
| 13 | 3(SLT/SST) | R | — | 149.19 | 125.81 |
| 14 | 3(SLT/SST | P | 800 | 123.41 | 104.35 |
| 15 | 5(SHALE) | R | — | 163.74 | 109.38 |
| 16 | 5(SHALE) | P | 800 | 0.0 | 0.0 |
| 17 | 2(SST) | R | — | 123.50 | 119.90 |
| 18 | 2(SST) | P | 675 | 0.0 | 18.08 |
| 19 | 4(ROT SST) | R | — | 134.80 | 120.36 |
| 20 | 4(ROT SST) | P | 675 | 0.0 | 0.0 |
| 5 | 7(SST) | R | — | 126.90 | 166.73 |
| 21 | 7(SST) | P | 675 | 0.0 | 6.96 |
| 15 | 5(SHALE) | R | — | 163.74 | 109.38 |
| 22 | 5(SHALE) | P | 675 | 0.0 | 6.38 |
| 23 | 5(SHALE) | P | 675 | 0.0 | 13.57 |
| 15 | 5(SHALE) | R | — | 163.74 | 109.38 |
| 24 | 5(SHALE) | P | 625 | 6.96 | 10.87 |
| 11 | 6(HALITE) | R | — | 128.50 | 106.32 |
| 25 | 6(HALITE) | P | 675 | 0.0 | 0.0 |

SST = sandstone
SLT = siltstone
ROT SST = Rotliegendes sandstone

The results indicate that for bed temperatures ranging from 900° C. down to 675° C., uncontaminated cuttings are produced. In Experiment 14, a blockage on the blade ring caused untreated cuttings to be discharged almost immediately after feeding. This explains the anomalous result.

Bed temperature only affected the oil retention when the temperature was reduced to 625° C.

No difference in oil retention could be detected between the different lithologies.

Analysis of the exit flue gases showed that the hydrocarbons initially present on the cuttings are effectively burned during processing and the exit gases still contained at least 5% usually at least 10% molecular oxygen. No dioxins or PCBs were found in the exit gases, the minimum sensitivity being 0.1 ppb.

Standard leaching tests were performed on some of the processed cuttings. All were within the "inert waste" range as quoted in proposed EC Directive 91/C 190 on waste management.

We claim:

1. A method for removing organic contaminants from solid particles comprising said contaminants, said method comprising the steps of:
   (a) providing solid uncontaminated particles to a processing chamber;
   (b) generating a circumferentially directed flow of fluid within the chamber to cause the uncontaminated particles to circulate about an axis of the chamber in a turbulent compact band;
   (c) providing solid particles contaminated with an organic contaminant to the processing chamber subsequent to steps (a) and (b);
   (d) generating a circumferentially directed flow of fluid within the chamber to cause the particles to circulate about an axis of the chamber in a turbulent compact band;
   (e) incinerating the particles within the chamber; and
   (f) removing the particles substantially free from organic contaminants from the chamber under gravity.

2. A method according to claim 1 wherein said particles contaminated with organic contaminants contain oil and water.

3. A method according to claim 2 wherein said particles comprise 1–20% hydrocarbon oil and 1–20% water.

4. A method according to claim 1 wherein said particles comprising contaminants are drill cuttings contaminated with oil.

5. A method according to claim 1 wherein said particles comprising contaminants are selected from the group consisting of sand, pebbles and soil each contaminated with oil.

6. A method according to claim 1 wherein said particles substantially free from organic contaminants are removed after incineration via a central discharge or a side exit port.

7. A method according to claim 1 wherein the particles are incinerated in step (e) at a temperature in the range 600° to 1200° C.

8. A method according to claim 7 wherein the particles are incinerated in step (e) at a temperature in the range 650° to 950° C.

9. A method according to claim 1 wherein the chamber is at 950°–1200° C.

10. A method according to claim 1 wherein in step (d) said flow of fluid causes the particles to circulate in said band about a substantially vertical axis.

11. A method according to claim 1 wherein said organic contaminant comprises oil, which is volatilised in said band and is incinerated in an upper part of said chamber.

12. A method according to claim 4, wherein in step (d) said flow of fluid causes the particles to circulate in said band about a substantially vertical axis.

13. A method according to claim 12, wherein in a step (e) said oil is incinerated at a temperature in the chamber of 950°–1200° C.

14. A method according to claim 12 wherein in step (e) the band temperature was 650°–950° C.

15. A method for removing oil contaminants from drill cuttings containing off, said method comprising the steps of:
(a) providing solid uncontaminated particles to a processing chamber;
(b) generating a circumferentially directed flow of fluid within the chamber to cause the uncontaminated particles to circulate about an axis of the chamber in a turbulent compact band;
(c) providing said cutting to the processing chamber subsequent to steps (a) and (b);
(d) generating a circumferentially directed flow of fluid within said chamber to cause said cuttings to circulate about an axis of the chamber in a turbulent compact band;
(e) heating said cuttings in said band in an oxidizing gas to effect incineration within the chamber and produce particles substantially free from oil; and
(f) removing said particles from said chamber under gravity.

16. A method according to claim 5, wherein in step (d), said flow of fluid causes the particles to circulate in said band about a substantially vertical axis.

17. A method according to claim 16, wherein the particles are incinerated in step (e) at a temperature in the range 600°–1200° C.

18. A method according to claim 17, wherein the particles are incinerated in step (e) at a temperature in the range of 650°–950° C.

19. A method according to claim 15, wherein in step (d) said flow of fluid causes the particles to circulate in said band about a substantially vertical axis.

20. A method according to claim 19, wherein the particles are incinerated in step (e) at a temperature in the range of 600°–1200° C.

21. A method according to claim 20, wherein in the particles are incinerated in step (e) at a temperature range 650° to 950° C.

22. A method according to claim 1, wherein said organic contaminant is a liquid hydrocarbon.

\* \* \* \* \*